United States Patent
Ruppert et al.

(10) Patent No.: US 7,237,636 B2
(45) Date of Patent: Jul. 3, 2007

(54) VEHICLE DRIVE ACCESS AND STORAGE DEVICE

(75) Inventors: Rex L. Ruppert, Benson, MN (US); Stephen H. Stuhr, Blomkest, MN (US)

(73) Assignee: CNH America LLC, Racine, WI (US)

( * ) Notice: Subject to any disclaimer, the term of this patent is extended or adjusted under 35 U.S.C. 154(b) by 316 days.

(21) Appl. No.: 10/882,903

(22) Filed: Jul. 1, 2004

(65) Prior Publication Data

US 2006/0001251 A1    Jan. 5, 2006

(51) Int. Cl.
B62D 25/24 (2006.01)
B60R 3/02 (2006.01)
B60R 11/06 (2006.01)

(52) U.S. Cl. ............... 180/89.17; 180/210; 280/164.1; 296/37.1; 224/585

(58) Field of Classification Search ............... 296/37.1, 296/37.6; 280/163, 164.1; 180/89.17, 69.24; 220/810; 224/585; D12/423, 425
See application file for complete search history.

(56) References Cited

U.S. PATENT DOCUMENTS

| | | | |
|---|---|---|---|
| 1,726,398 A | | 8/1929 | Limbocker |
| 2,157,793 A | * | 5/1939 | Lang ........................... 280/848 |
| 3,217,354 A | * | 11/1965 | May ............................ 16/338 |
| 3,347,334 A | | 10/1967 | Schroeder |
| 3,865,210 A | | 2/1975 | Von Fummetti et al. |
| 4,013,136 A | | 3/1977 | Fear |
| 4,074,786 A | | 2/1978 | Joubert |
| 4,830,421 A | | 5/1989 | Hawelka et al. |
| D351,843 S | * | 10/1994 | Larson et al. ................. D15/13 |
| 5,398,987 A | * | 3/1995 | Sturgis ....................... 296/37.6 |
| 5,558,384 A | | 9/1996 | Mouterde et al. |
| 6,340,191 B1 | | 1/2002 | Brady |
| 6,553,339 B1 | | 4/2003 | Komatsubara |
| 6,719,346 B2 | | 4/2004 | Bettin et al. |
| 6,756,693 B2 | * | 6/2004 | Kennedy ..................... 290/1 A |
| 6,817,433 B1 | * | 11/2004 | Bergstrom et al. ........ 180/89.12 |
| 2003/0111859 A1 | | 6/2003 | Bettin et al. |

OTHER PUBLICATIONS

AGCO, Terra-Gator 4-Wheel Applicator Chassis Sales Brochure, 2003, all pages.
AGCO, Terra-Gator 3-Wheel Applicator Chassis Sales Brochure, all pages.

(Continued)

Primary Examiner—Faye M. Fleming
Assistant Examiner—Joseph Rocca
(74) Attorney, Agent, or Firm—Rebecca Henkel (57) ABSTRACT

A side mounted storage device is provided for an agricultural applicator having a frame assembly in support of a drive unit or engine configured to drive the agricultural applicator on a plurality of wheel assemblies in a forward direction of travel. The storage device includes a fixed storage compartment and a pivotal storage compartment. The pivotal storage compartment is pivotally attached at the forward end of the fixed storage compartment with respect to the forward direction of travel of the agricultural applicator. From a closed position, the pivotal storage compartment is coupled to swing in a radially outward direction with respect to the frame assembly of the agricultural applicator. In a preferred embodiment, the pivotal storage compartment in the open position provides an operator on the ground with ready access to the engine.

20 Claims, 7 Drawing Sheets

OTHER PUBLICATIONS

Agchem, Terra-Gator 8144 & 8104 Sales Brochure, 1999, all pages.
Agchem, Terra-Gator 8103 Sales Brochure, 1998, all pages.
Agchem, Terra-Gator 1903 Sales Brochure, 1998, all pages.
Agchem, Terra-Gator 1803 Sales Brochure, all pages.
Agchem, Terra-Gator 1603T Sales Brochure, all pages.
Agchem, Terra-Gator 1803 info request, all pages.
Agchem, Terra-Gator 1903 info request, all pages.

* cited by examiner

VEHICLE DRIVE ACCESS AND STORAGE DEVICE

FIELD OF THE INVENTION

The invention relates to a drive access and storage device for an agricultural applicator and, more particularly, to an agricultural applicator with an access and storage device that includes multiple hinged-compartments configured to provide storage as well as access to an engine and/or battery of the agricultural applicator.

BACKGROUND OF THE INVENTION

Numerous types of agricultural applicators are available today. These can include a pull-type unit or a self-propelled unit. A certain known agricultural applicator is also referred to a "floater." The floater is a large vehicle that uses large, oversized floatation tires to carry the vehicle across firm to muddy agricultural fields. The chassis assembly of the floater includes three or more floatation tires. The typical chassis includes a pair of rear floatation tires and a front floatation tire. The chassis assembly is configured to support one or more bulk storage tanks or bins of product for application in an agricultural environment usually before planting in the spring or after harvest in the fall. The types of agricultural products e.g., fertilizer, herbicide, pesticide, nutrients, etc. can vary. The floater can also be utilized to tow various agricultural implements. The oversized-tired agricultural applicators are generally desired for their ability to maneuver heavy loads over extremely rough and difficult agricultural terrain without substantial compaction of the soil.

However, these certain floater-type agricultural applicators have drawbacks. For optimum performance, floaters are generally designed so that the front floatation tire is positioned as far forward as possible, and the engine is positioned as far rearward from the front floatation tire as far as possible. Moreover, there is a desire to limit the wheel base between the front floatation tire and the rear floatation tires so that the frame assembly is as short as possible. This leaves little space on the frame assembly to mount the engine, the battery, storage compartments, etc. between the front and rear floatation tires. Due to this premium on frame capacity between the front and rear floatation tires, these certain known floaters include "side-mounted" compartments or storage boxes for storing various items (e.g., personal protective equipment, tools, etc.) associated with operation of the floater, or for mounting ladders to access the elevated cab. Certain known storage compartments that extend alongside the drive unit limit access to the drive unit or engine to only from above, via the hood assembly or from below the frame assembly. Other known storage compartments have limited storage capacity because further extension would interfere with an operator standing on the ground from accessing the drive unit.

Thus, there is a need for an agricultural applicator with a side-mounted storage device that provides additional storage space for miscellaneous items associated with operation of the agricultural applicator. There is also a need for a side-mounted storage device that also allows an operator standing on the ground to access and service the engine. Furthermore, there is a need for a side-mounted storage device that allows an operator to access the miscellaneous items located or stored inside the side-mounted storage device.

SUMMARY OF THE INVENTION

The present invention provides a side-mounted storage device for a vehicle. The vehicle generally includes a frame assembly in support of a drive unit configured to drive the vehicle on a plurality of wheel assemblies in a forward direction of travel. The frame assembly has a first side and a second side opposite the first side relative to a central longitudinal axis of the frame assembly. The storage device includes a fixed storage compartment mounted at one of the first and second sides of the agricultural applicator. The fixed storage compartment has a forward end and a rearward end relative to the forward direction of travel of the vehicle, and defines a first storage area therein. The storage device further includes a pivotal storage compartment that defines a second storage area and is pivotally coupled to move between an open and a closed position. The pivotal storage compartment is pivotally attached at the forward end of the fixed storage compartment, and coupled to swing in a radially outward direction with respect to the frame assembly of the vehicle.

The preferred pivotal storage compartment in a closed position is located alongside at least a portion of the drive unit. In an open position, the pivotal storage compartment is positioned radially outward from one of the first and second sides of the vehicle in such a manner so as to allow an operator standing on the ground to access at least a portion of the drive unit. The pivotal storage compartment preferably includes a pivotal top cover configured to swing upward and to provide access to the second storage area in the pivotal storage compartment. The side-mounted storage device further includes a ladder mounted on the pivotal storage compartment. The ladder extends in a generally forward direction relative to the forward direction of travel of the vehicle. The storage device can further include a latch mechanism configured to hold the pivotal storage compartment in a closed position enclosed against the storage box. The preferable latch mechanism is interlinked by an extension arm to a release lever located on the pivotal storage compartment opposite the hinge assembly.

In another embodiment, the present invention provides a side-mounted storage device for a three-wheeled vehicle having a frame assembly in support of a drive unit. The frame assembly includes a first frame side support and a second frame side support. The first frame side support is located on one side of the longitudinal axis defined by the frame assembly. The second frame side support is located on the other side of the longitudinal axis opposite the first frame side support. The drive unit is interconnected with a fuel tank and at least one battery in a known manner. The storage device includes a fixed storage compartment mounted at one of the first and second frame side supports, the fixed storage compartment comprising a side panel, a top panel, and a bottom panel that defines a first storage area therebetween. The first storage area is configured to receive the fuel tank of the drive unit. The fixed storage compartment includes a forward end and a rearward end relative to the forward direction of travel of the three-wheeled vehicle. The storage device further includes a pivotal storage compartment pivotally coupled by a hinge assembly located at the forward end of the fixed storage compartment. The pivotal storage compartment extends alongside at least a portion of the drive unit. The pivotal storage compartment is pivotally coupled to swing from a closed position to an open position in a radially outward direction from the frame assembly. The pivotal storage compartment in the open position allows an operator standing on the ground to access at least a portion of the drive unit.

Another embodiment of the present invention provides a three-wheeled agricultural applicator having a frame assembly having a longitudinal axis. The frame assembly includes a first frame side support positioned on one side of a longitudinal axis, and a second frame side support located on the opposite side of the longitudinal axis from the first frame side support. The three-wheeled agricultural applicator further includes a cab and an engine supported on the frame assembly. The engine is interconnected to drive the frame assembly on a plurality of wheel assemblies in a forward direction of travel. The three-wheeled agricultural applicator further includes a first storage device mounted at the first frame side support. The first storage device includes a first fixed storage compartment having a forward end and a rearward end relative to the forward direction of travel, and defining a storage area therein. The storage device further includes a pivotal storage compartment pivotally coupled by a hinge assembly located at the forward end of the first fixed storage compartment. The pivotal storage compartment is positioned at least partially alongside a portion of the engine. The pivotal storage compartment is pivotally coupled to swing from a closed position to an open position in a radially outward direction relative to the frame assembly.

The three-wheeled agricultural applicator further includes a second storage device mounted at the second frame side support. The second storage device includes a second fixed storage compartment that defines a fixed storage area configured to store a fuel tank associated in a known manner with the drive unit. The second storage device further includes a second pivotal storage compartment pivotally coupled by a hinge assembly located at the forward end of the second fixed storage compartment. The second pivotal storage compartment is positioned alongside at least a portion of the engine. The second pivotal storage compartment is pivotally coupled to swing from a closed position to an open position in a radially outward direction from the frame assembly.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of vehicles could be constructed in accordance with the invention defined by the claims. Hence, while preferred embodiments of a side-mounted storage device in accordance with the invention will now be generally described with reference to a three-wheeled agricultural applicator, it should be understood that the invention is in no way so limited. The side-mounted storage device can be configured for any type of vehicle (e.g., three-wheeled agricultural applicator, recreational vehicles, trucks, etc.) and is not limiting on the invention.

Figure 1:
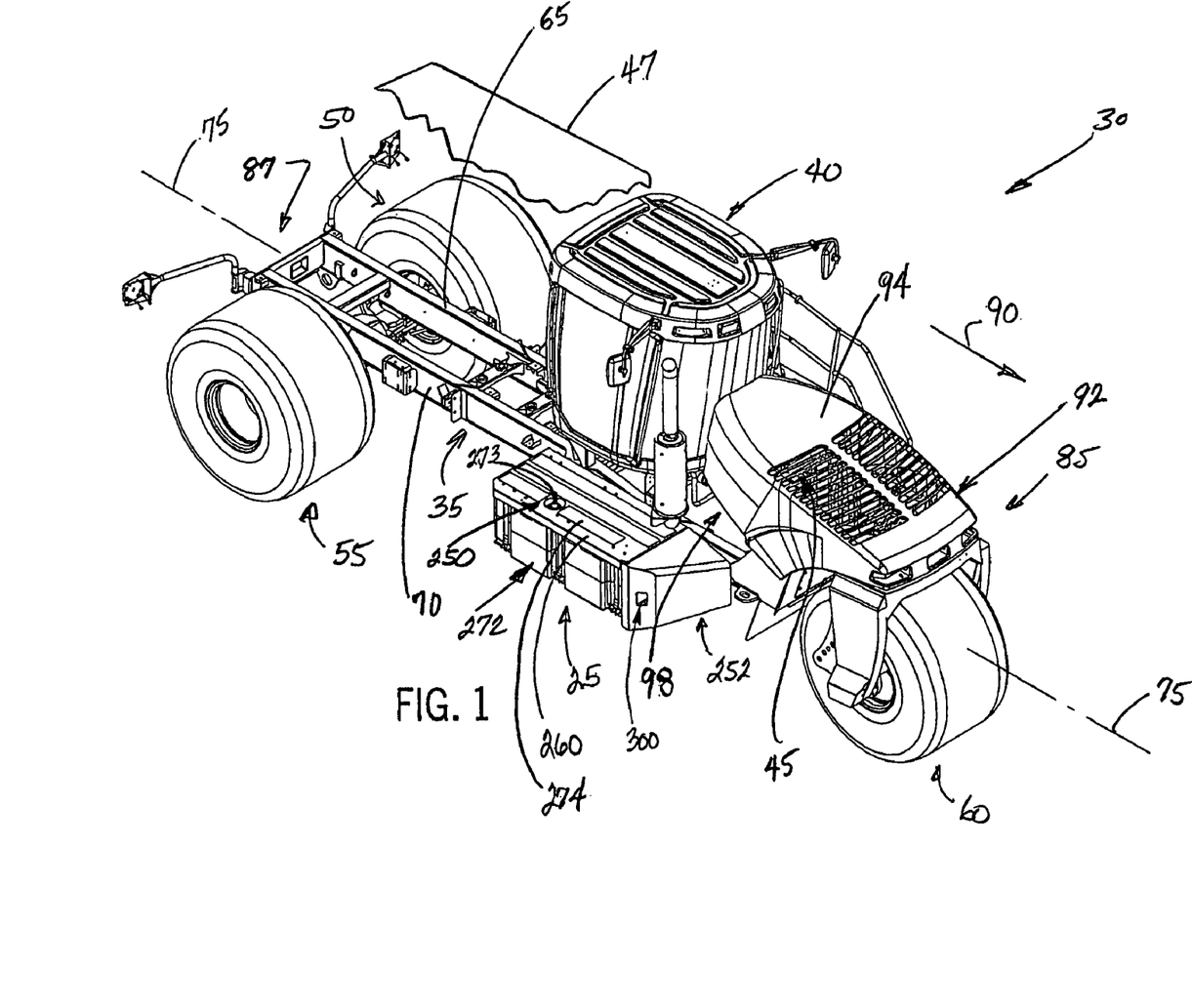
FIG. 1 illustrates an isometric view of an agricultural applicator in accordance with the present invention.
Figure 2:
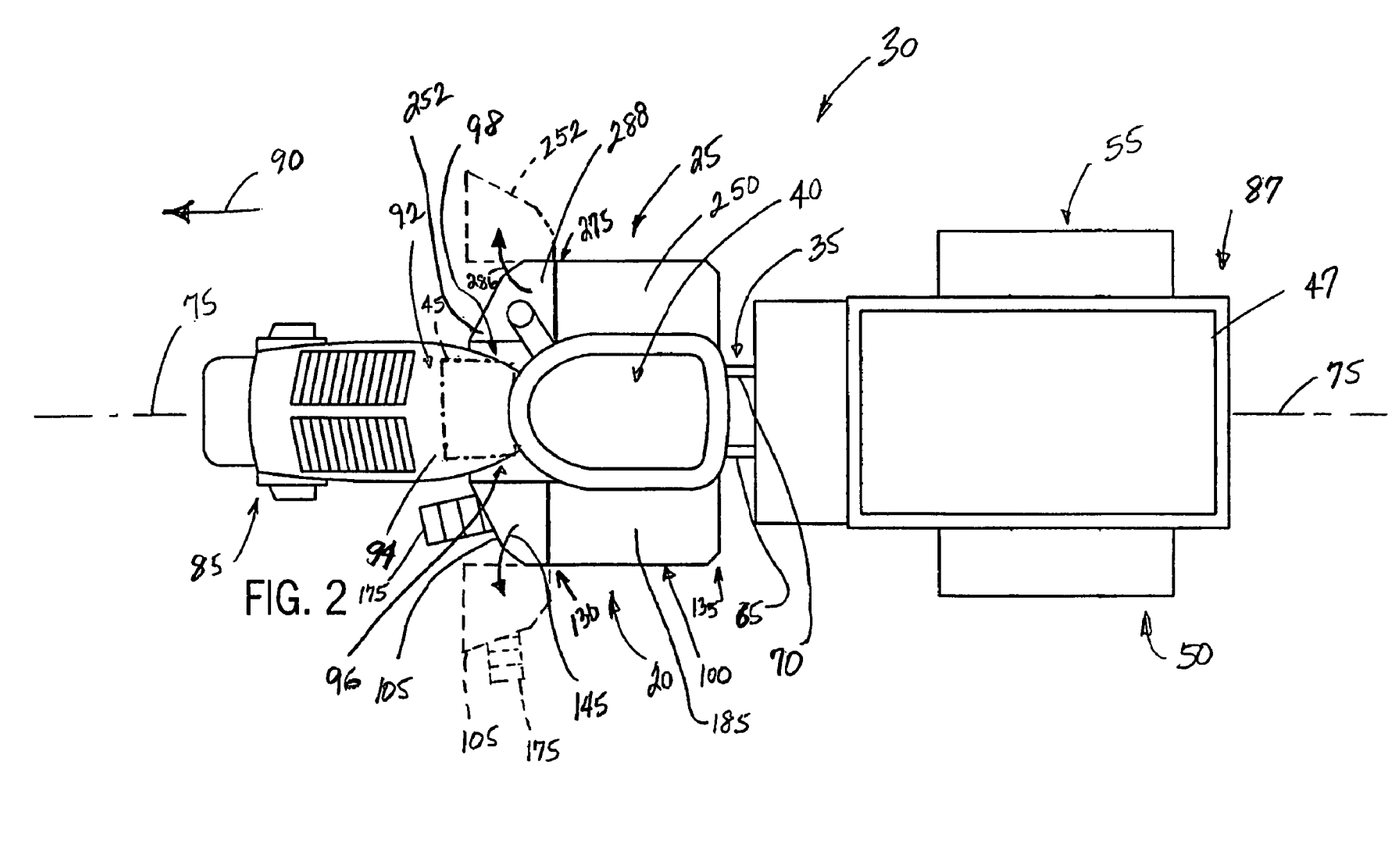
FIG. 2 illustrates a top view of the agricultural applicator in FIG. 1.

FIGS. 1 and 2 illustrate a preferred embodiment of a first side-mounted storage device 20 and a second side-mounted storage device 25 in accordance with the present invention configured with an agricultural applicator. The preferred agricultural applicator shown is a conventional agricultural applicator herein referred to as "a floater" 30. The floater 30 is a type of agricultural applicator commonly used to apply crop nutrients or animal or human waste (sludge) to soils, typically before planting in the spring and/or after harvest in the fall.

As illustrated in FIGS. 1 and 2, the floater 30 generally includes a frame assembly 35 in support of a cab 40, a drive unit 45, and a storage tank 47 on a series of wheel assemblies. The series of wheel assemblies preferably includes a first rear wheel assembly 50, a second rear wheel assembly 55, and a single front wheel assembly 60. Even though the preferred embodiment of the floater 30 is shown with three wheel assemblies 50, 55 and 60, the number of wheel assemblies (e.g., a four-wheeled machine or a five-wheel machine, etc.) can vary.

As illustrated in FIGS. 1 and 2, the frame assembly 35 preferably includes a first frame side support 65 and a second frame side support 70. The first frame side support 65 is located on one side of a longitudinal axis 75 defined by the frame assembly 35. The second frame side support 70 is located on the other side of the longitudinal axis 75 opposite the first frame side support 65.

Still referring to FIGS. 1 and 2, the frame assembly 35 has a forward end 85 and a rearward end 87 relative to a forward direction of travel (represented by arrow 90) of the floater 30. The preferred drive unit 45 is a diesel engine, but the type of drive unit 45 (e.g., internal combustion, hydraulic, pneumatic, etc., or combination thereof) can vary. The drive unit 45 is enclosed by a hood assembly 92 preferably mounted between the cab 40 and the forward end 85 of the frame assembly 35. The hood assembly 92 includes a hood 94 that is movable between a closed position and an open position to provide access to the enclosed drive unit 45 from an above direction. In the closed position, the hood 94 is configured to provide a first side opening 96 and a second side opening 98 that provide side access to the drive unit 45 of the floater 30. The first and second side openings 96 and 98 thus provide an operator standing on the ground with side access the drive unit 45.

Figure 5:
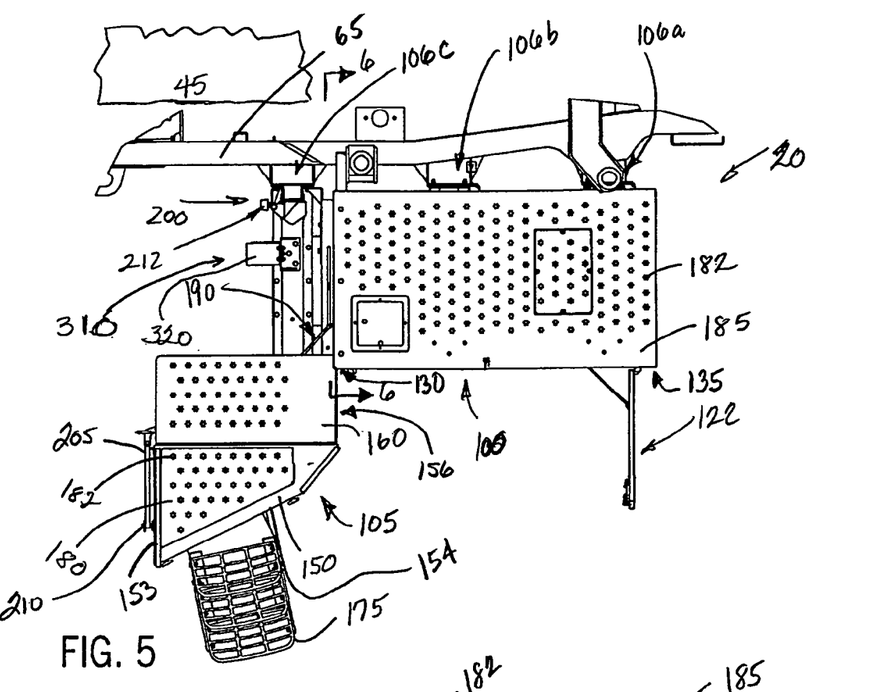
FIG. 5 illustrates a detailed top view of the first side-mounted storage device in FIG. 4.

FIGS. 3, 4, 5 and 6 illustrate detailed views of the preferred first side mounted storage device 20 in accordance with the present invention. As illustrated in FIG. 5, the first side mounted storage device 20 includes a fixed storage compartment 100 and a first pivotal storage compartment 105 attached by a series of mounting brackets 106a, 106b, and 106c fastened (e.g., weld, bolts, etc.) to the first frame side support 65. Mounting brackets 106a and 106b are positioned to support the fixed storage compartment 100, and mounting bracket 106c is configured to support the pivotal storage compartment 105. The type and number of mounting brackets 106a, 106b, and 106c can vary and is not limiting on the invention.

As illustrated in FIGS. 3, 4, 5 and 6, the first fixed storage compartment 100 generally includes a side panel 110, a top panel 115, a bottom panel 120, and at least one pivotal door assembly 122 all of which generally define a first fixed storage area 125 therebetween. The first fixed storage compartment 100 generally has a forward end 130 and a rearward end 135 relative to the forward direction of travel 90 of the floater 30.

FIGS. 2, 4, 5 and 6 illustrate that the first pivotal storage compartment 105 is pivotally coupled by a first hinge assembly 140 (See FIG. 6) attached at the forward end 130 of the fixed storage compartment 100. Referring to FIG. 2, the first pivotal storage compartment 105 generally extends or is positioned alongside at least a portion of the drive unit 45 (See hidden as a dashed line in FIG. 2) of the floater 30 relative to the forward direction of travel 90. The first pivotal storage compartment 105 is pivotally coupled to swing from a closed position (illustrated by the solid lines in FIG. 2) to an open position (illustrated by the dashed lines in FIG. 2) in a radially outward direction (illustrated by arrow 145 in FIG. 2). More specifically, the first pivotal storage compartment swings radially outward from its closed position against the first fixed storage compartment 100 relative to the drive unit 45 and frame assembly 35 of the floater 30. In the open position, the first pivotal storage compartment 105 provides an operator standing on the ground with partial or full access to a side of the drive unit 45 via the opening 98 defined by the hood assembly 92.

Figures 3, 4:
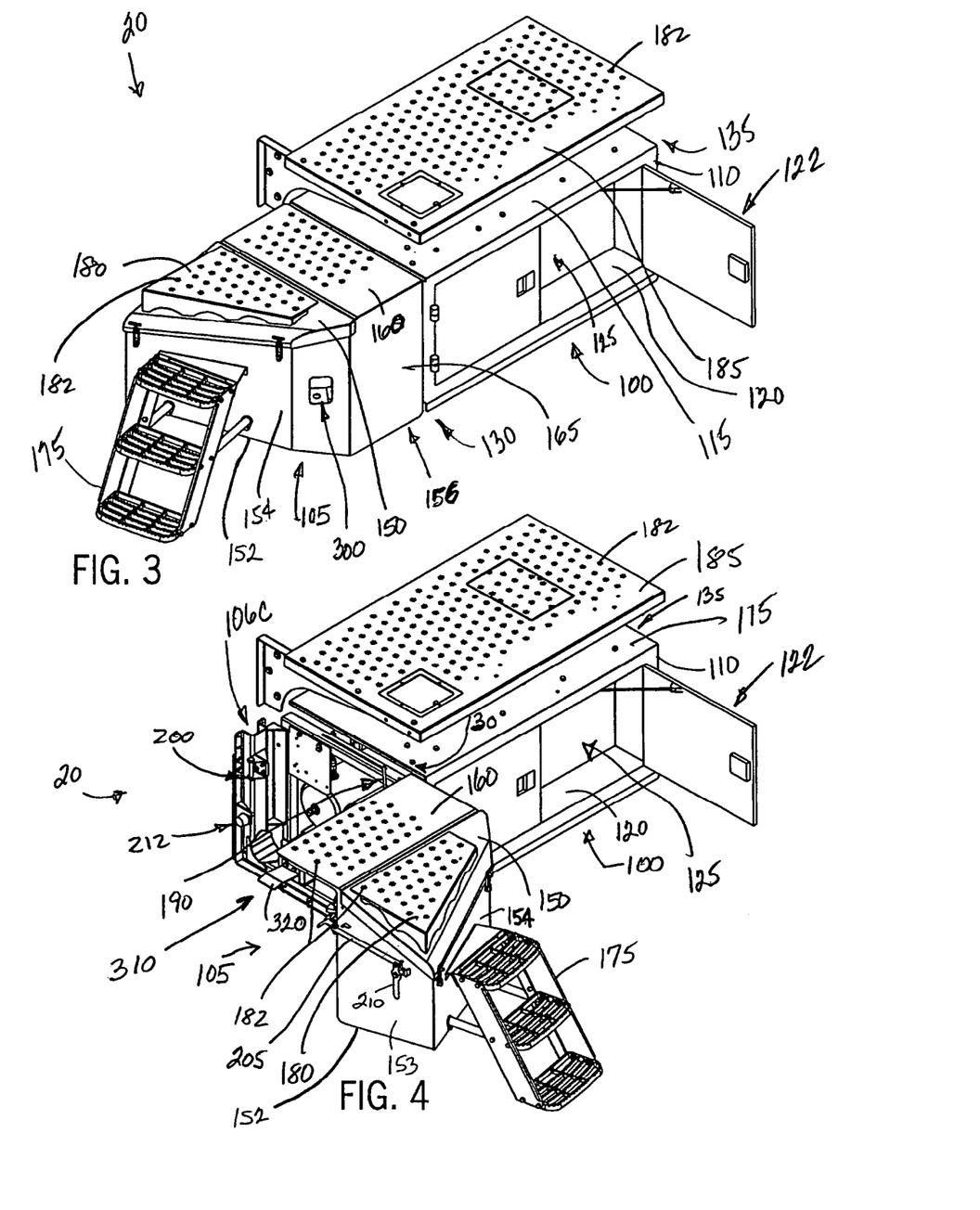
FIG. 3 illustrates a detailed forward isometric view of the first side-mounted storage device shown in FIG. 1, the pivotal storage compartment in a closed position.
FIG. 4 illustrates a detailed forward isometric view of the first side-mounted storage device shown in FIG. 1, the pivotal storage compartment in an open position.

Referring now to FIGS. 3, 4, 4A, and 5, the preferred first pivotal storage compartment 105 includes a pivotal top cover 150 configured with a bottom panel 152, a first sidewall 153, and a second sidewall 154. As shown by FIG. 3, when the first pivotal storage compartment 105 is in the closed position, the preferred top cover 150 is angled downward in a forward direction, relative to the forward direction of travel 90 of the floater 30. The preferred bottom panel 152 and sidewalls 153 and 154 generally define a generally trapezoidal- or triangular-shaped storage area 155 therein (See FIGS. 4A and 5). Of course, the shape of the first pivotal storage compartment 105 can vary. A lift assist assembly (not shown) e.g., gas cylinder, etc. can be interconnected in a known manner to assist moving the top cover 150 upward or to hold the top cover 150 at an open position.

Figure 4A:
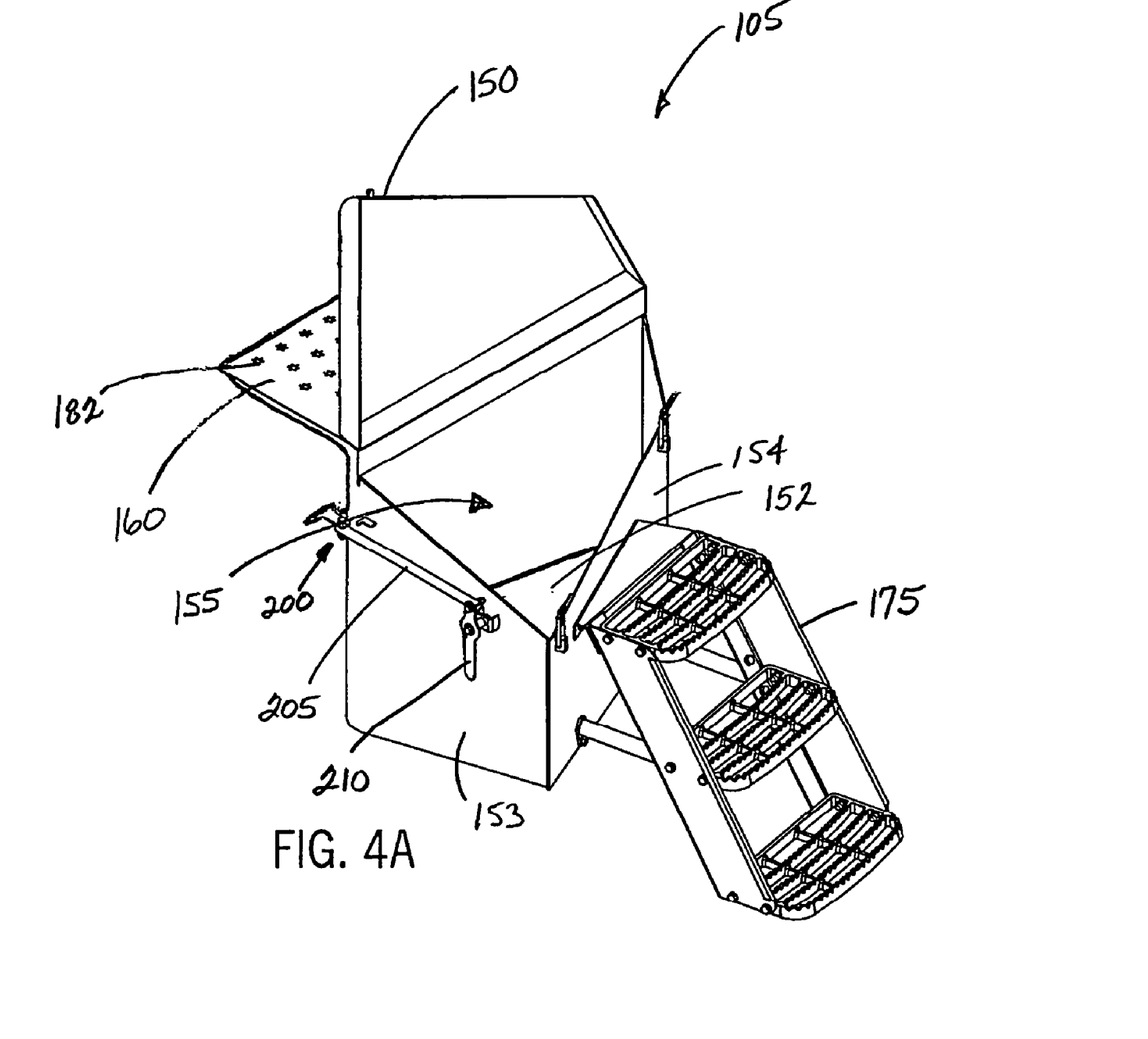
FIG. 4A illustrates a detailed forward isometric view of the pivotal storage compartment shown in FIG. 4, the top cover in an open position.

Referring specifically to FIGS. 3, 4A and 5, the pivotal storage compartment 105 further includes a spacer portion 156 extending rearward from the pivotal top cover 150. The spacer portion 156 includes a fixed cover 160 and a side panel 165. In the closed position (FIG. 3), the spacer portion 156 in combination with the mounting bracket 106c (See FIG. 5) enclose the pivotal storage area 155 (See FIG. 4A) of the pivotal storage compartment 105.

Referring to FIGS. 2, 3, 4, 4A and 5, the preferred first pivotal storage compartment 105 further includes a ladder 175. The ladder 175 extends in a generally forward direction relative to the forward direction of travel 90 of the floater 30. This preferred forward alignment of the ladder 175 does not expand a side-to-side profile of the floater 30 transverse to the forward direction of travel 90. However, although the ladder 175 is shown with a forward alignment, the alignment of the ladder 175 can vary. Moreover, the type and length of the ladder 175 can vary.

Referring to FIGS. 3, 4 and 5, the top cover 150 of the first pivotal storage compartment 105 of the first storage device 20 can include a flat tread plate 180 mounted thereon to enhance walking between the ladder 175 and the cab 40. The fixed cover 160 of the spacer portion 155 and the tread plate 180 can include grip protuberances 182 which are configured to prevent slippage. The first storage device 20 can further include an additional step plate 185 located or mounted above the top panel 115 of the first fixed storage compartment 100. The step plate 185 allows more ready access to the cab 40. The step plate 185 can include grip protuberances 182, in a similar manner to the tread plate 180, to prevent slippage.

Figure 6:
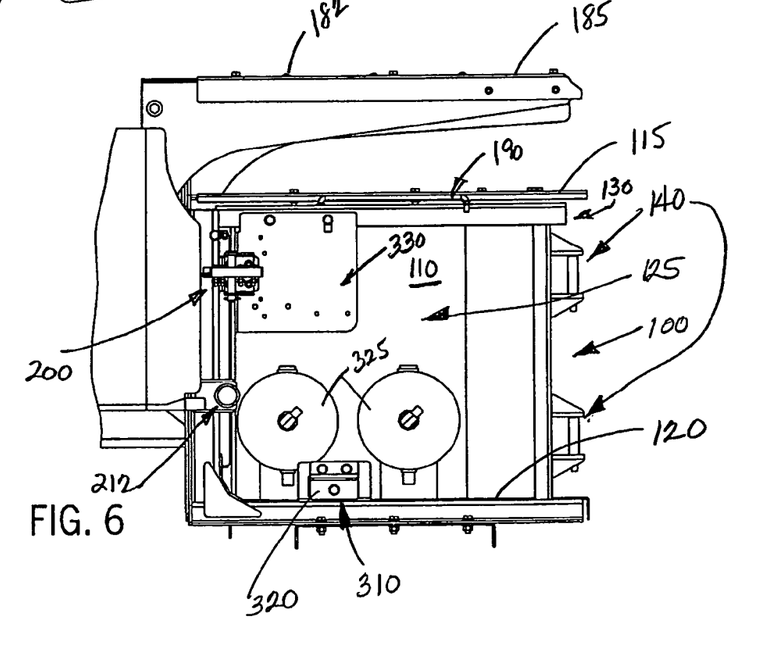
FIG. 6 illustrates a detailed end view of the first side-mounted storage device along lines 6—6 in FIG. 5.

Referring now to FIGS. 4, 5 and 6, an assist device 190 can interconnect the first pivotal storage compartment 105 and the first fixed storage compartment 100. The preferred assist device 190 is a j-hook type assembly that is configured in a known manner to maintain the first pivotal storage compartment 105 in the open position, as illustrated by FIG. 4. The type of assist device 190 (e.g., tension spring, hydraulic cylinder, etc.) can vary.

As illustrated in FIGS. 4, 4A, 5 and 6, the first storage device 20 further includes a latch mechanism 200 configured to releaseably secure the first pivotal storage compartment 105 in a closed position against the first fixed storage compartment 100. Referring to FIGS. 4, 4A, and 5, the latch mechanism 200 is interlinked by an extension arm or latch linkage 205 to a release lever 210. The extension arm 205 and the release lever 210 are located on the first pivotal storage compartment 105 along sidewall 153 of the first pivotal compartment 105. Referring to FIGS. 4, 5 and 6, the first storage device 20 can further include a rubber stop 212 positioned to hold the first pivotal storage compartment 105 in the closed position tightly against the first fixed storage compartment 100.

Figure 7:
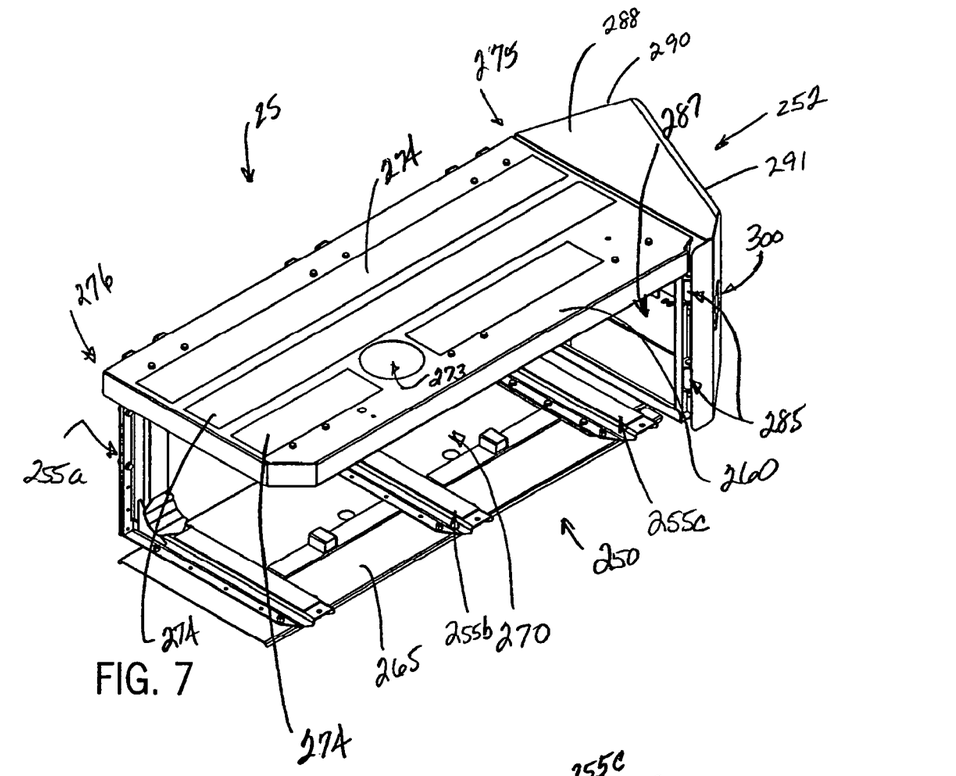
FIG. 7 illustrates a detailed rearward isometric view of the second side-mounted storage device in FIG. 2.
Figure 8:
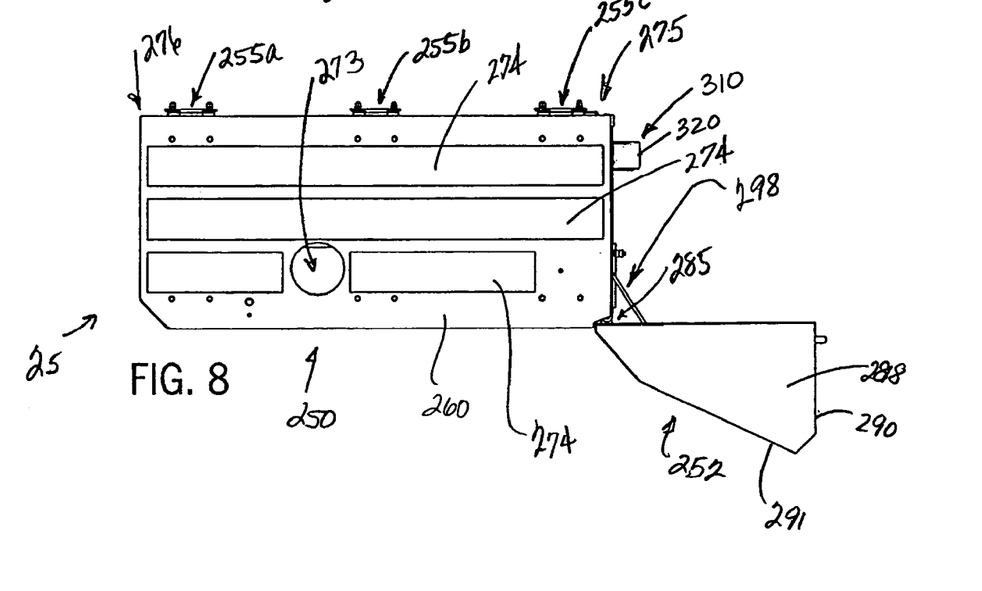
FIG. 8 illustrates a top view of the second side-mounted storage device in FIG. 7.
Figure 9:
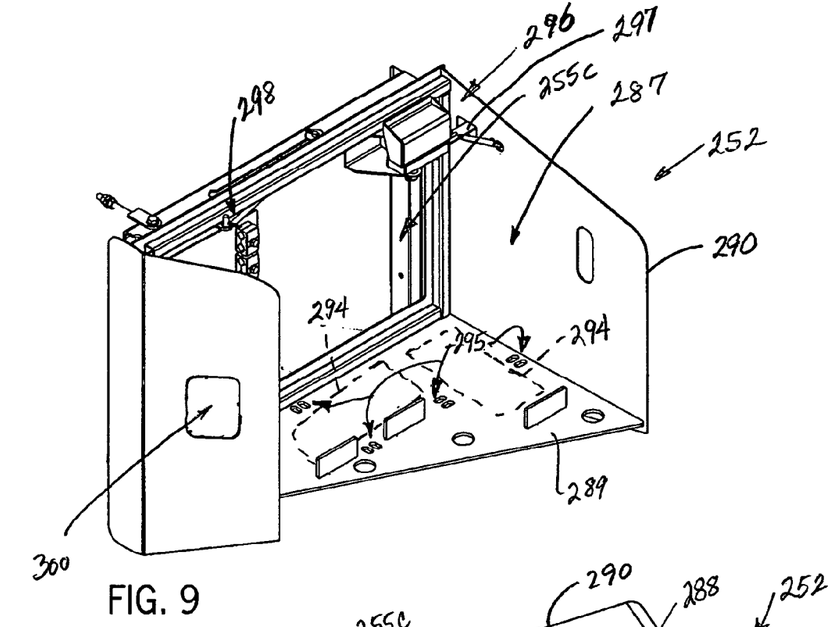
FIG. 9 illustrates a detailed front isometric view of an interior of a pivotal storage compartment of the second side-mounted storage device shown in FIG. 7.
Figure 10:
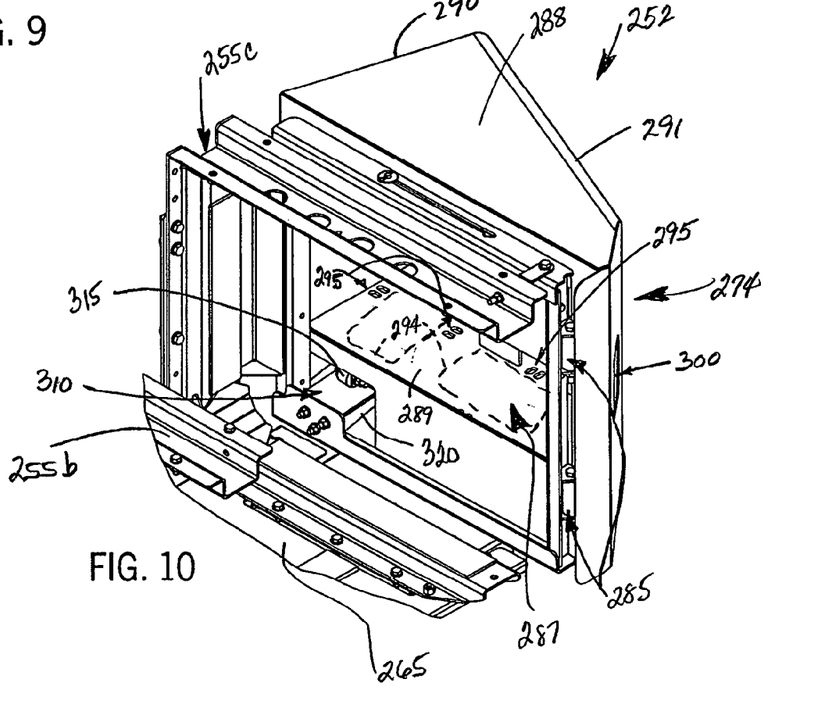
FIG. 10 illustrates a detailed rear isometric view of an interior of pivotal storage compartment of the second side-mounted storage device shown in FIG. 7.

FIGS. 1, 2, and 7–10 illustrate the preferred second side-mounted storage device 25 in accordance with the present invention. As illustrated in FIGS. 1 and 2, the second fixed storage compartment 250 is mounted or attached at the second frame side support 70 and located opposite the first side-mounted storage device 20. Referring to FIGS. 7, 8, and 10, the second side-mounted storage device 25 includes a second fixed storage compartment 250 and a second pivotal storage compartment 252 mounted by a series of mounting brackets 255a, 255b, and 255c to the second frame side support 70, similar to the mounting brackets 106a, 106b, and 106c of the first storage device 20 described above that are mounted to the first frame side support 65.

As illustrated in FIGS. 1, 2, 7, and 8, the second fixed storage compartment 250 comprises a top panel 260 and a bottom panel 265 that define a second fixed storage area 270 therebetween, similar to the first fixed storage area 125 of the first fixed storage compartment 100 described above. As illustrated in FIG. 1, the second fixed storage area 270 can receive a fuel tank 272 connected in a known manner with the drive unit 45. The top panel 260 of the second fixed storage compartment 250 includes an opening 273 to provide access to a fill cap of the fuel tank 272 of the drive unit 45. The top panel 260 of the second fixed storage compartment 250 can further include a series of grip strips 274 attached thereon. The second fixed storage compartment 250 includes a forward end 275 and a rearward end 276 relative to the forward direction of travel 90 of the floater 30.

Referring to FIGS. 1, 2, 7, and 8, the second pivotal storage compartment 252 is pivotally coupled by a second hinge assembly 285 located at the forward end 275 of the second fixed storage compartment 250. As illustrated in FIGS. 1 and 2, the second pivotal storage compartment 252 is positioned alongside at least a portion of the drive unit 45 (See FIG. 2). FIG. 2 illustrates that the second pivotal storage compartment 252 is pivotally coupled to swing from a closed position (shown by the solid lines) to an open position (shown by the dashed lines) in a radially outward direction (illustrated by arrow 286) from the frame assembly 35 and the drive unit 45. In the open position, the second pivotal storage compartment 252 allows an operator standing on the ground to access at least a portion of the drive unit 45 via the opening 96 defined by the hood 94. Moreover, the second pivotal storage compartment 252 in the open position allows an operator to access a storage area 287 (see FIG. 10) defined by the pivotal storage compartment 252.

Referring to FIGS. 1, 8, and 10, the second pivotal storage compartment 252 generally includes a top panel 288, a bottom panel 289, a first sidewall 290, and a second sidewall 291, all of which generally define the storage area 287 therein. FIG. 9 provides a front isometric view of the preferred trapezoidal- or triangular-shaped interior storage area 287 of the second pivotal storage compartment 252 (sidewall 291 and the top panel 188 removed). As shown in FIGS. 1, 7, and 10, the top panel 288 is sloped downward in a forward direction relative to the forward direction of travel 90, similar to the first pivotal storage compartment 105 of the first storage device 20.

As illustrated in FIGS. 9 and 10, the second pivotal storage compartment 252 is configured to receive at least one battery or battery cell 294 (shown by the dashed lines) associated with the drive unit 45. The at least one battery 294 can be aligned parallel, perpendicular, or a combination thereof relative to the longitudinal axis 75 (see FIG. 1) of the floater 30. Hold-downs (not shown) can be provided to mount the at least one battery 294 to a series of slots 295 in the second pivotal storage compartment 252.

Referring now to FIG. 9, the second pivotal storage compartment 252 further includes a second latch mechanism 296 having a lever 297 extending therethrough. The latch mechanism 296 is configured to releaseably attach the second pivotal storage compartment 252 in the closed position to the second fixed storage compartment 250. A rubber stop (not shown), similar to the rubber stop 212 described above, can be located between the latch mechanism 296 and the mounting bracket 255c to hold the second pivotal storage compartment 252 tight against the second fixed storage compartment 250. In the open position, the second pivotal storage compartment 252 also allows access to the one or more batteries (not shown) stored therein.

Referring to FIGS. 8 and 9, the second storage device 25 can further include an assist device 298 interconnecting the second fixed storage compartment 250 and the second pivotal storage compartment 252, similar to the assist device 190 described above. The preferred assist device 298 is aj-hook assembly that is operable in a known manner to hold the second pivotal storage compartment 252 in the open position.

Referring back to FIGS. 1 and 2, the preferred first and second pivotal storage compartments 105 and 252 are generally triangular-shaped and angled/tapered inward toward the longitudinal axis 75 as well as angled downward in a forward direction relative to the forward direction of travel 90. This tapered-shape enhances the aerodynamics and aesthetics of the storage devices 20 and 25 of the floater 30. Referring to FIGS. 1, 3, 9 and 10, the first and second pivotal compartments 105 and 252 can further include one or more recess or cutout portions 300 configured to mount exterior lights that enhance visibility around the first and second storage devices 20 and 25. The first and second pivotal storage compartments 105 and 252 can further include miscellaneous seals to protect the storage therein from the environment (e.g., rain, debris, etc.).

Referring now to FIGS. 4–6, 8, and 10, to accommodate the weight of the first and second pivotal storage compartments 105 and 252, as well as the weight of the items stored therein (e.g., battery cells 294) or attached thereon (e.g., ladder 175), each first and second pivotal storage compartment 105 and 252 includes a guide assembly 310. As best illustrated in FIGS. 6 and 10, the preferred guide assembly 310 includes a wheel assembly 315 in combination with a ramp 320 configured to enhance operator ease in moving the first and second pivotal storage compartments 105 and 252, respectively, between the closed and open positions. The wheel assembly 315 is mounted on the underside of the first and second pivotal storage compartments 105 and 252. The ramp 320 is mounted on the first and second fixed storage compartments 100 and 250, respectively, in such a manner so as to receive the wheel assembly 315. As illustrated in FIG. 10, the wheel assembly 315 rolls up the ramp 320, thereby aiding alignment of the first and second pivotal storage compartments 105 and 252 with the associated first and second fixed storage compartments 100 and 250, respectively.

In operation, the first and/or the second storage devices 20 and 25 are side-mounted to the frame assembly 35 of the floater 30. The first and second storage devices 20 and 25 can be integrated with a floater 30, or provided as a separate add-on package unit. In the closed position, as illustrated in FIGS. 1 and 2, the first and second storage devices 20 and 25 are positioned adjacent to or extend alongside at least a portion of the drive unit 45 to provide additional storage area as desired by operators of floaters 30. Referring to FIG. 6, the first fixed storage compartment 100 of the first storage device 20 can be used to store pneumatic tanks 325 and a pneumatic manifold 330 associated with driving various pneumatic systems of the floater 30, as well as to provide storage for various tools associated with operation of the floater 30. The first pivotal storage compartment 105 of the first storage device 20 can be used to store miscellaneous equipment (e.g., personal protective equipment (PPE), etc.) associated with operation of the floater 30. Referring to FIGS. 9 and 10, as previously discussed, the second pivotal storage compartment 252 of the second storage device 25 can be used to store the at least one battery cell 294 (e.g., 12-volt) interlinked in a known manner with the drive unit 45 of the floater 30.

When either of the first and second storage devices 20 and 25 are in the open position (as illustrated by the dashed lines in FIG. 2), the first and second storage devices 20 and 25 allow an operator standing on the ground to access the drive unit 45 for service or daily maintenance via openings 96 and 98 defined by the hood 94 of the hood assembly 92. Typical services areas on the drive unit 45 that are accessible via the openings 96 and 98 include an oil level gauge, an oil fill, an oil filter, a fan belt, a fuel filter, an alternator, a water coolant filter, etc. Moreover, the operator can also access the battery cells 294 and other miscellaneous items (e.g., pneumatic tanks 325, pneumatic manifold 330, fittings, battery cells 294, etc.) stored in the first and/or second storage devices 20 and 25.

Many changes and modifications could be made to the invention without departing from the spirit thereof. The scope of these changes will become apparent from the appended claims.

We claim:

1. A side-mounted storage device for a vehicle, the vehicle including a frame assembly in support of a forward-mounted drive unit configured to drive the vehicle on a plurality of wheel assemblies in a forward direction of travel, the frame assembly having a first side and a second side opposite the first side relative to a central longitudinal axis of the frame assembly, the side-mounted storage device comprising:
    a fixed storage compartment mounted at one of the first and second sides of the vehicle, the fixed storage compartment defining a first storage area therein; and
    a pivotal storage compartment that defines a second storage area therein, the pivotal storage compartment pivotally coupled at the forward end of the fixed storage compartment relative to the forward direction of travel,
wherein the pivotal storage compartment is pivotally coupled to swing from a closed position to an open position in a radially outward direction with respect to the central longitudinal axis of the frame assembly.

2. The side-mounted storage device as recited in claim 1, wherein the pivotal storage compartment includes a pivotal top cover, the pivotal top cover angled downward in the forward direction of travel, and wherein the first pivotal storage compartment is angled inward towards the central longitudinal axis of the frame assembly in the forward direction of travel.

3. The side-mounted storage device as recited in claim 1, wherein the pivotal storage compartment in a closed position extends alongside at least a portion of the drive unit in a forward direction relative to the forward direction of travel, and wherein the pivotal storage compartment in an open position allows an operator on the ground to access the at least a portion of the drive unit.

4. The side-mounted storage device as recited in claim 1, further including a ladder mounted on the pivotal storage compartment, the ladder aligned in a generally forward direction relative to the forward direction of travel of the agricultural applicator.

5. The side-mounted storage device as recited in claim 1, wherein the pivotal storage compartment is pivotally coupled to the fixed storage compartment by at least one hinge assembly, wherein the storage device includes a latch mechanism configured to hold the pivotal storage compartment in a closed position against the fixed storage compartment, the latch mechanism interlinked by an extension arm to a release lever, and wherein the extension arm and the release lever are located on the pivotal storage compartment opposite the at least one hinge assembly.

6. A side-mounted storage device for a three-wheeled vehicle having a forward-mounted drive unit supported by a frame assembly in support on three wheel assemblies, the frame assembly including a first frame side support and a second frame support, the first frame support located on one side of a central longitudinal axis defined by the frame assembly in a forward direction of travel, and the second frame side support located on the other side of the central longitudinal axis opposite the first frame support, the storage device comprising:
    a fixed storage compartment mounted at one of the first and the second frame side supports, the fixed storage compartment defining a first storage area, the fixed storage compartment having a forward end and a rearward end relative to the forward direction of travel of the vehicle;
    a pivotal storage compartment pivotally coupled by a hinge assembly located at the forward end of the fixed storage compartment, the pivotal storage compartment extending alongside at least a portion of the drive unit, the pivotal storage compartment pivotally coupled to swing from a closed position to an open position in a radially outward direction from the central longitudinal axis defined by the frame assembly,
wherein the pivotal storage compartment in the open position allows an operator standing on the ground to access the at least a portion of the drive unit.

7. The side-mounted storage device as recited in claim 6, further comprising a guide assembly that includes a wheel assembly and a ramp, wherein the wheel assembly is mounted on the pivotal storage compartment and the ramp is mounted on the fixed storage compartment, and wherein the wheel assembly engages and rolls up the ramp as the pivotal storage compartment moves from the open position toward the closed position, wherein the wheel assembly in combination with the ramp align the pivotal storage assembly in the closed position with the fixed storage assembly.

8. The side-mounted storage device as recited in claim 7, wherein the pivotal storage compartment is angled toward the central longitudinal axis of the frame assembly.

9. The side-mounted storage device as recited in claim 7, wherein the pivotal storage compartment includes at least one recess to mount an external light therein.

10. A three-wheeled agricultural applicator, comprising:
    a frame assembly having a central longitudinal axis extending in a forward direction of travel of the agricultural applicator, the frame assembly having a first side and a second side opposite the first side with respect to the central longitudinal axis;
    a cab supported on the frame assembly;
    a drive unit supported on the frame assembly, the drive unit interconnected to drive the frame assembly on a plurality of wheel assemblies;
    a first fixed storage device mounted at the first side of the frame assembly, the first storage device having a forward end and a rearward end relative to the forward direction of travel of the agricultural applicator, the first storage device defining a first storage area therein; and
    a first pivotal storage compartment pivotally coupled at the forward end of the first fixed storage device and defining a second storage area therein, the first pivotal storage compartment in a closed position extending alongside at least a portion of the drive unit, the first pivotal storage compartment pivotally coupled to swing from the closed position to an open position in a radially outward direction with respect to the central longitudinal axis of the frame assembly, the first pivotal storage compartment in the open position allowing an operator access to an opening for an operator standing on the ground to access the at least a portion of the drive unit.

11. The three-wheeled agricultural applicator as recited in claim 10, further comprising:
  a second fixed storage device mounted at the second side of the frame assembly, the second fixed storage device defining a third storage area therein configured to receive a fuel tank of the drive unit, the second storage device having a forward end and a rearward end relative to the forward direction of travel of the agricultural applicator; and
  a second pivotal storage compartment pivotally coupled at the forward end of the second fixed storage device, the second pivotal storage compartment defining a fourth storage area therein, the second pivotal storage compartment in a closed position extending alongside the at least a portion of the drive unit, the second pivotal storage compartment pivotally coupled to swing from the closed position to an open position in a radially outward direction with respect to the central longitudinal axis of the frame assembly.

12. The three-wheeled agricultural applicator as recited in claim 11, wherein the frame assembly further includes a first frame side support at the first side of the frame assembly and a second side support at the second side of the frame assembly, wherein a first set of mounting brackets are attached to the first frame side support and are in support of the first storage device, and wherein a second set of mounting brackets are attached to the second frame side support and are in support of the second storage device.

13. The three-wheeled agricultural applicator as recited in claim 11, wherein the first and the second pivotal storage compartments each is pivotally coupled by at least one hinge assembly, wherein the first storage device and the second storage device each includes a latch mechanism configured to hold the first and second pivotal storage compartments in a closed position, the latch mechanism interlinked by an extension arm to a release lever located opposite the at least one hinge assembly.

14. The three-wheeled agricultural applicator as recited in claim 13, wherein the first and second storage devices each further comprises:
  a guide assembly configured to align the first and second pivotal storage compartments associated with each first and second fixed storage compartment, respectively, the guide assembly including a wheel assembly in combination with a ramp, wherein the wheel assembly is mounted on each first and second pivotal storage compartments, wherein the ramp is mounted on each first and second fixed storage compartments so as to receive the wheel assembly.

15. The three-wheeled agricultural applicator as recited in claim 14, wherein the second fixed storage compartment includes a top panel having an opening to provide access to fill the fuel tank located in the fixed storage compartment, and wherein the second pivotal storage compartment is mounted with at least one battery associated with the drive unit.

16. The three-wheeled agricultural applicator as recited in claim 10, wherein the agricultural applicator further includes a pneumatic reservoir interconnected with a pneumatic control manifold operable to drive one or more pneumatic systems of the agricultural applicator, wherein the pneumatic reservoir and the pneumatic control manifold are mounted in the first fixed storage compartment such that the first pivotal storage compartment in the open position allows access to the pneumatic reservoir and the pneumatic control manifold.

17. The three-wheeled agricultural applicator as recited in claim 16, wherein the first pivotal storage compartment includes a pivotal top cover that in an open position provides access to the second storage area therein.

18. The three-wheeled agricultural applicator as recited in claim 17, wherein the pivotal top cover is angled downward in the forward direction of travel, and wherein the first pivotal storage compartment is angled inward towards the central longitudinal axis of the frame assembly in the forward direction of travel.

19. The three-wheeled agricultural applicator as recited in claim 10, further including a ladder mounted on the first pivotal storage compartment, the ladder generally aligned in the forward direction of travel of the agricultural applicator.

20. The three-wheeled agricultural applicator as recited in claim 10, further comprising a j-hook assembly interconnecting the first pivotal storage compartment and the first fixed storage compartment, wherein the j-hook assembly is operable to hold the first pivotal storage compartment in the open position.

* * * * *